US006494582B2

(12) United States Patent
Kim

(10) Patent No.: US 6,494,582 B2
(45) Date of Patent: Dec. 17, 2002

(54) PROJECTION MONITOR HAVING DARKROOM

(75) Inventor: Seong-Soo Kim, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 20 days.

(21) Appl. No.: 09/736,278

(22) Filed: Dec. 15, 2000

(65) Prior Publication Data

US 2001/0012093 A1 Aug. 9, 2001

(30) Foreign Application Priority Data

Feb. 3, 2000 (KR) .......................................... 2000-5414

(51) Int. Cl.$^7$ ........................ G03B 21/22; G03B 21/30; G03B 21/28; G03B 21/14; H04N 5/64
(52) U.S. Cl. ............................. 353/74; 353/72; 353/73; 353/75; 353/78; 353/79; 353/119; 348/843
(58) Field of Search ............................. 353/72, 73, 74, 353/75, 76, 77, 78, 79, 119; 348/836, 843

(56) References Cited

U.S. PATENT DOCUMENTS

| 4,491,872 A | | 1/1985 | Boldt et al. .................. 348/782 |
| 5,408,283 A | * | 4/1995 | Lee .............................. 353/77 |
| 5,692,820 A | * | 12/1997 | Gale et al. ..................... 353/77 |
| 6,412,955 B1 | * | 7/2002 | Han ........................... 353/122 |

FOREIGN PATENT DOCUMENTS

| JP | 3-028883 | 3/1991 |
| JP | 4-061577 | 2/1992 |
| JP | 4-066884 | 6/1992 |
| JP | 4-096182 | 8/1992 |
| JP | 10-013771 | 1/1998 |
| KR | 96-027923 | 8/1996 |

\* cited by examiner

Primary Examiner—Christopher Mahoney
Assistant Examiner—Magda Cruz
(74) Attorney, Agent, or Firm—Robert E. Bushnell, Esq.

(57) ABSTRACT

The present invention relates to a projection monitor, and in particular to a projection monitor having a darkroom casing capable of preventing a penetration of a foreign material and any leakage of light and easily assembling reflection mirrors which guide the image projected by the engine to a screen. The projection monitor having a darkroom casing according to the present invention includes a front casing having a screen installed on a front surface of the same, a rear casing engaged to the back of the front casing and forming a sealed space behind the front casing, a darkroom casing engaged to the back of the front casing in the rear casing and forming a darkroom by which a foreign material and light do not penetrate into the interior of the rear casing, an engine installed in the interior of the darkroom casing and generating and light in accordance with an input of an electrical video signal and projecting an image, and at least three reflection mirrors attached on an inner wall of the darkroom casing and sequentially reflecting the image projected by the engine and guiding the image to the screen and being inserted into fixing ribs installed parallel on the ceiling of the darkroom casing like a drawer. In the present invention, since the image projected by the engine is projected on the screen without any scattering and interference and leakage, the resolution is excellent. In addition, it is possible to easily assembly the reflection mirrors on the ceiling of the darkroom casing.

9 Claims, 6 Drawing Sheets

PROJECTION MONITOR HAVING DARKROOM

CLAIM OF PRIORITY

This application makes reference to, incorporates the same herein, and claims all benefits accruing under 35 U.S.C. §119 from my application entitled PROJECTION MONITOR HAVING A DARKROOM filed with the Korean Industrial Property Office on Feb. 3, 2000 and there duly assigned Ser. No. 2000/5414.

BACKGROUND OF THE INVENTION

1. Field of the Invention

The present invention relates to a projection monitor, and in particular to a projection monitor having a darkroom capable of preventing a foreign material such as dust from being penetrated into the interior of a projection monitor and easily assembling the reflection mirrors to a darkroom casing by changing an optical axis of an image projected from an engine.

2. Description of the Background Art

Generally, a video display apparatus capable of projecting an optical energy on a screen is classified into a direct viewing type video display apparatus and a projection type video display apparatus based on a method for displaying an optical energy on a screen.

A CRT(Cathode Ray Tube) which is called as Brown tube is known as a representative one of the straight type video display apparatus. The CRT apparatus has a good resolution. However, the size of the same is increased, the weight and volume of the CRT apparatus is increased for thereby increasing-a fabrication cost.

A LCD(Liquid Crystal Display), a DMA(Deformable Mirror Array), and an AMA(Actuator Mirror Array) are known as the projection type video display apparatus. A projection television or projection monitor is a kind of the projection type video display apparatus. Namely, the projection type video display apparatus generates R, G, B(Red, Green, Blue) colors which are three primary colors of light and obtains a desired image by projecting on a screen using an expanding lens and reflection mirror.

The video projection of Japan Utility model laid-open No. 4-096182 uses a CRT as a video image generation apparatus and is directed to projecting the image projected by the CRT on a screen and expanding the image. Therefore, the above video projector may be considered as a projection type video display apparatus. In the case of the above video projector, a shield casing is installed between the CRT of the cabinet and the screen for sealing a projection way of the video image, so that a certain problem is caused due to dust, and a resolution is decreased due to a light scattering problem.

However, the above-described video projector uses a large size CRT as a video projecting apparatus capable of projecting an image on the screen and one reflection mirror. Therefore, there is a limit for increasing the distance between the CRT and the screen, which is related to the screen expanding ratio. The above-described projector has a resolution which is worse compared to the projection type video display apparatus which uses the engine as a video display apparatus. When expanding the size of the screen, the resolution is decreased. The entire weight and volume of the system are increased, and the fabrication cost is increased.

SUMMARY OF THE INVENTION

Accordingly, it is an object of the present invention to provide an improved projection monitor.

It is also an object of the present invention to provide a projection monitor with a darkroom casing is capable of preventing a penetration of a foreign material such as dust which may scatter light of the engine projected on a screen and preventing any leakage of the light from the engine and obtaining an excellent resolution.

It is yet another object of the present invention to provide a projection monitor with a larger screen expanding ratio which is achieved by having three reflection mirrors between the engine and the screen and by having sufficient distance between the engine and the screen.

It is still yet another object of the present invention to provide for easy installation of the reflecting mirrors within the darkroom casing.

To achieve the above objects, there is provided a projection monitor having a darkroom casing which includes a front casing having a screen installed on a front surface of the same, a rear casing engaged to the back of the front casing and forming a sealed space behind the front casing, a darkroom casing engaged to the back of the front casing in the rear casing and forming a darkroom by which a foreign material and light do not penetrate into the interior of the rear casing, an engine installed in the interior of the darkroom casing and generating and light in accordance with an input of an electrical video signal and projecting an image, and at least three reflection mirrors attached on an inner wall of the darkroom casing and sequentially reflecting the image projected by the engine and guiding the image to the screen and being inserted into fixing ribs installed parallel on the ceiling of the darkroom casing like a drawer.

A bracket is engaged to a front rim portion of the reflection mirror fixed on the ceiling of the darkroom casing and inserted between the ceiling of the darkroom casing and the fixing rib when the reflection mirror is inserted between the ceiling of the darkroom casing and the fixing rib for thereby preventing light from entering or escaping the darkroom casing. The rear wall of the darkroom casing is slanted in the back direction, and at least one among the reflection mirrors is fixed by the frame at both sides of the same and is attached on the rear wall of the darkroom casing.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
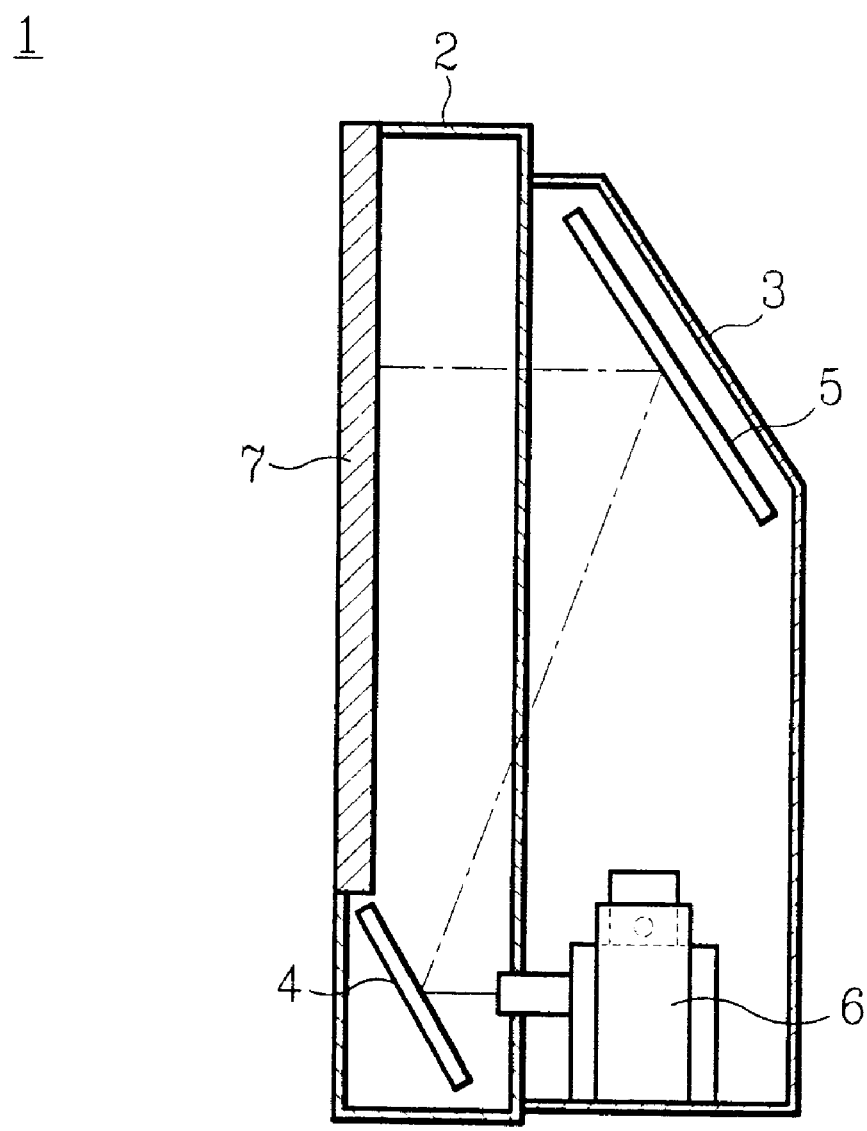
FIG. 1 is a schematic lateral cross-sectional view of a projection monitor.

FIG. 1 is a schematic cross-sectional view illustrating the construction of a projection monitor. As shown therein, the projection monitor 1 includes a rear casing 3 engaged to the back surface of a front casing 2 and forming a sealed space, an engine 6 for generating light in accordance with an input of an electrical video signal, controlling the way of light and projecting the light onto the screen, a first reflection mirror 4 and a second reflection mirror 5 for changing the optical axis of a video image projected by the engine and outputting into the screen 7, and a screen 7 for displaying the video image projected by the engine 6 thereon.

The thusly constituted projection monitor 1 changes the optical axis of the video image projected by the engine 6 through the first and second reflection mirrors 4 and 5 and projects on the surface of the screen 7 for thereby displaying an electrical video signal inputted into the engine 6 on the surface of the screen as an image.

In the above-described projection monitor, a foreign material such as dust may be penetrated into the interior of the system through a gap formed between the front casing and the rear casing or a plurality of small holes formed in the front casing and rear casing for thereby being attached on the engine 6 and the screen 7, so that a light scattering problem occurs. In addition, a part of the light projected by the engine onto the screen 7 is outputted to the outside through a gap between the front casing and rear casing. Furthermore, light may be inputted from the outside. Since the thusly inputted light may be interfered with the light projected from the engine onto the screen 7, the resolution is decreased. In FIG. 1, a light projection distance from the engine 6 to the screen 7 is short because two reflection mirrors 4 and 5 are used. In this case an image expanding ratio is decreased. The reflection mirrors 4 and 5 are attached to the rear casing 3 by fixing both sides of the same using a frame(not shown) fixed by screws. In this case, when attaching the reflection mirror 5 to a rear slanted surface of the rear casing 3, a worker must engage the screws in a sit-down posture from the lower portion to the upper portion for thereby decreasing an assembling efficiency and increasing the number of assembling operations.

Figure 2:
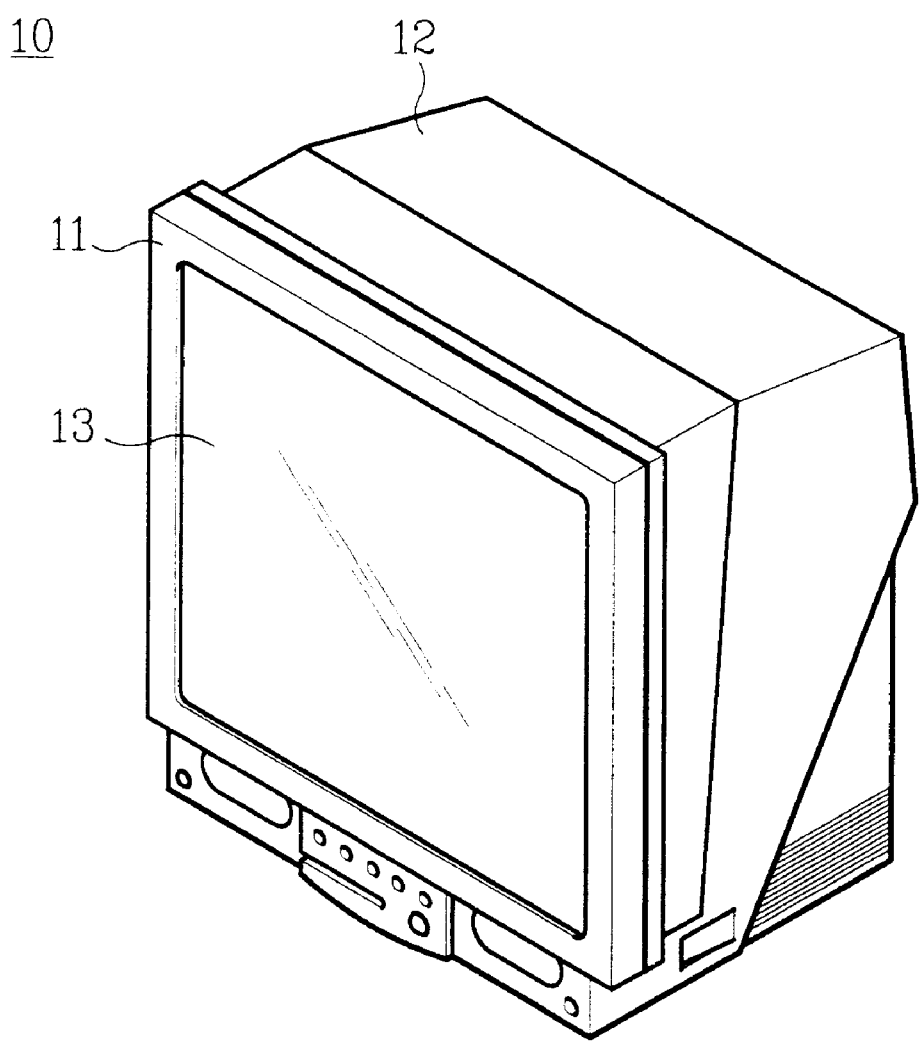
FIG. 2 is a perspective view of a projection monitor having a darkroom casing according to an embodiment of the present invention.
Figure 3:
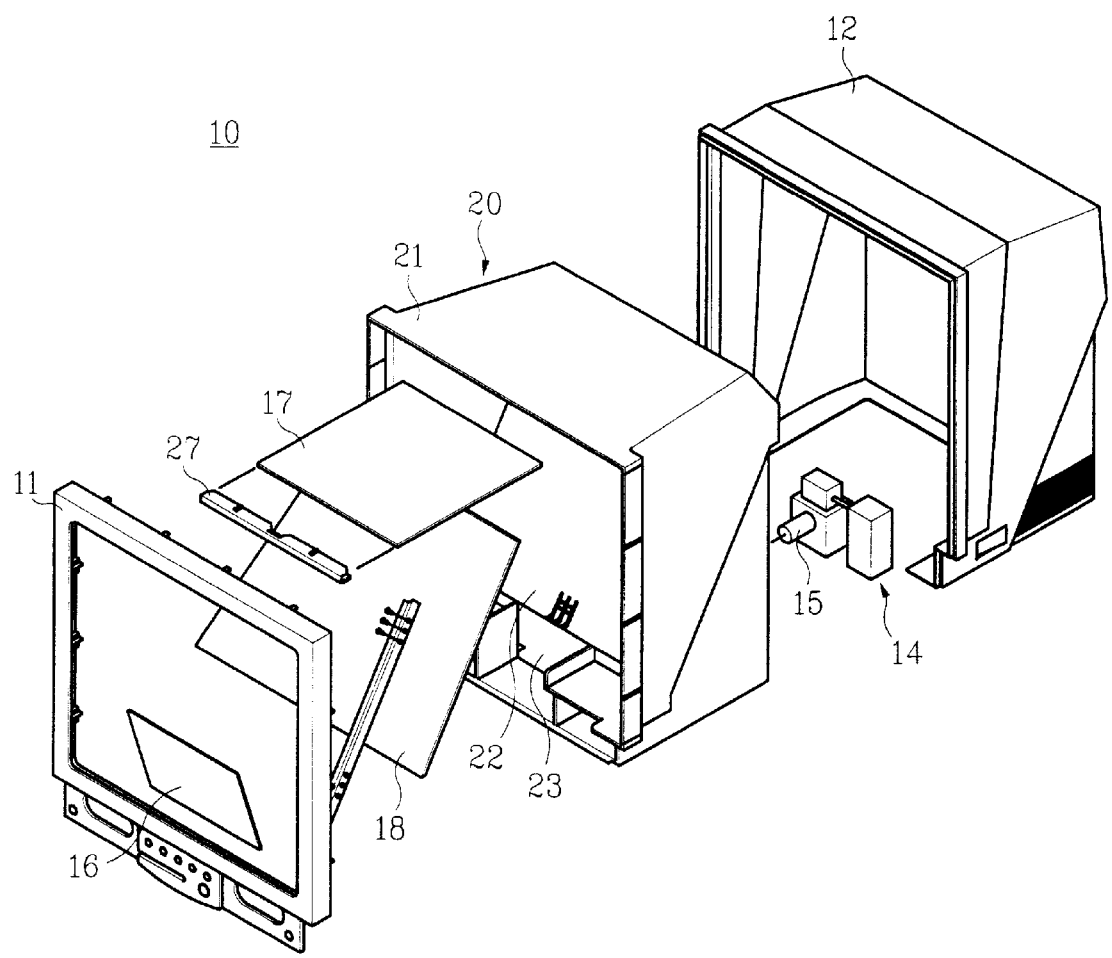
FIG. 3 is a disassembled perspective view illustrating a projection monitor having a darkroom according to an embodiment of the present invention.

FIG. 2 is a perspective view illustrating a projection monitor 10, and FIG. 3 is a disassembled perspective view illustrating the construction of FIG. 2. As shown therein, the projection monitor having a darkroom casing according to the present invention includes a front casing 11 in which a screen is installed 13, a rear casing 12 engaged to a back surface of the front casing 11 and forming a sealed space, a darkroom casing 20 engaged to a back surface of the front casing 11 in the rear casing 12 for forming a darkroom in the rear casing 12, into which a foreign material and light are not penetrated, an engine 14 installed in the darkroom casing 20 and generating light in accordance with an input of an electrical video signal and projecting an image, and first, second and third reflection mirrors 16, 17 and 18 attached to an inner wall of the darkroom casing 20 for sequentially reflecting the image projected from the engine 14 and guiding to the screen 13.

The darkroom casing 20 engaged to the back of the front casing 11 in the rear casing 12 is a box-shaped casing having an opened front surface. The darkroom casing 20 seals a surrounding portion of the image projection way formed from the engine 14 to the screen 13 and prevents a foreign material from being penetrated and blocks light. Therefore, the image of the engine 14 projected through a passing-through port 23 of the darkroom casing 20 is projected to the screen 13 without any interference due to light scattering phenomenon or external light for thereby enhancing a resolution of the screen 13.

Figure 4:
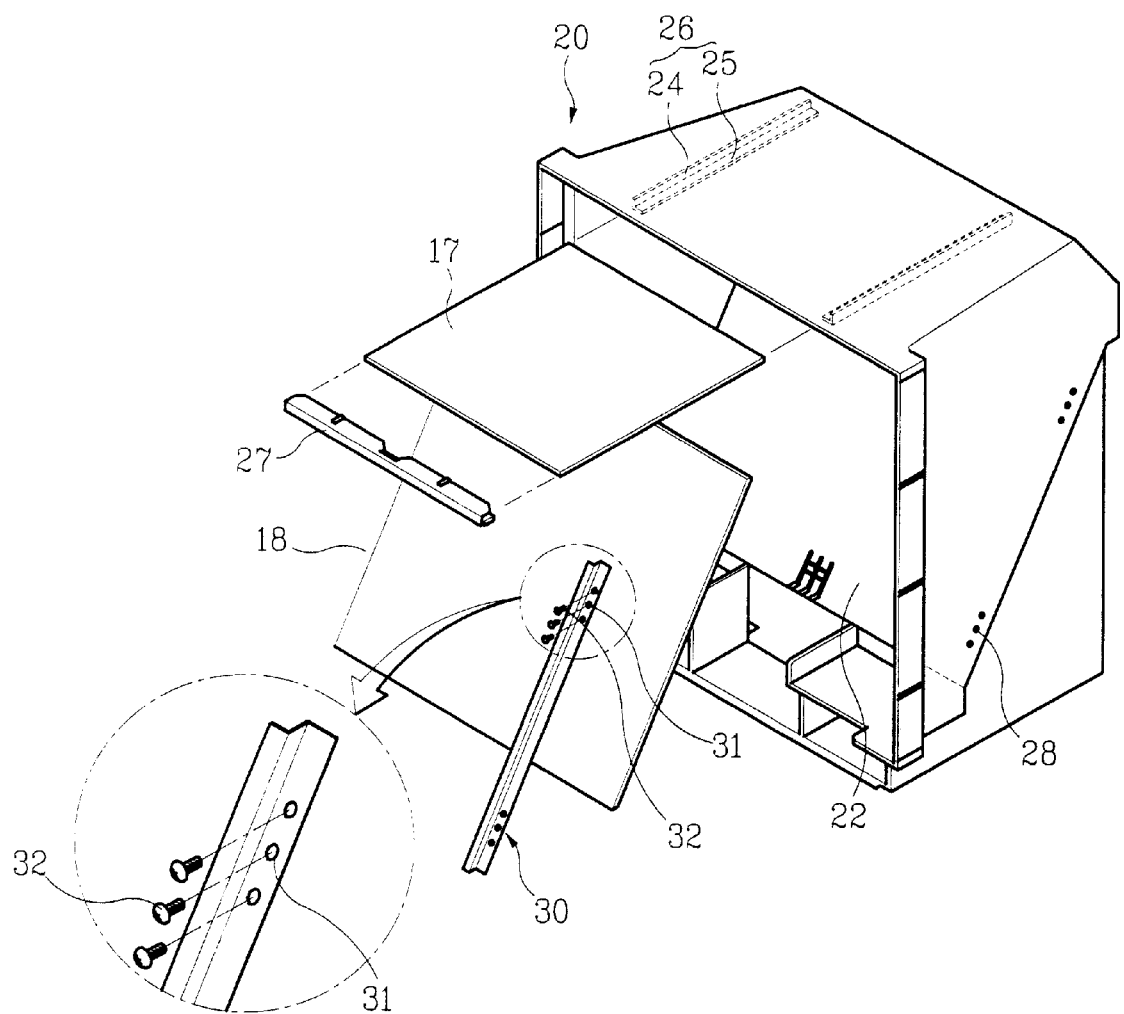
FIG. 4 is an enlarged disassembled perspective view of FIG. 3.
Figure 5:
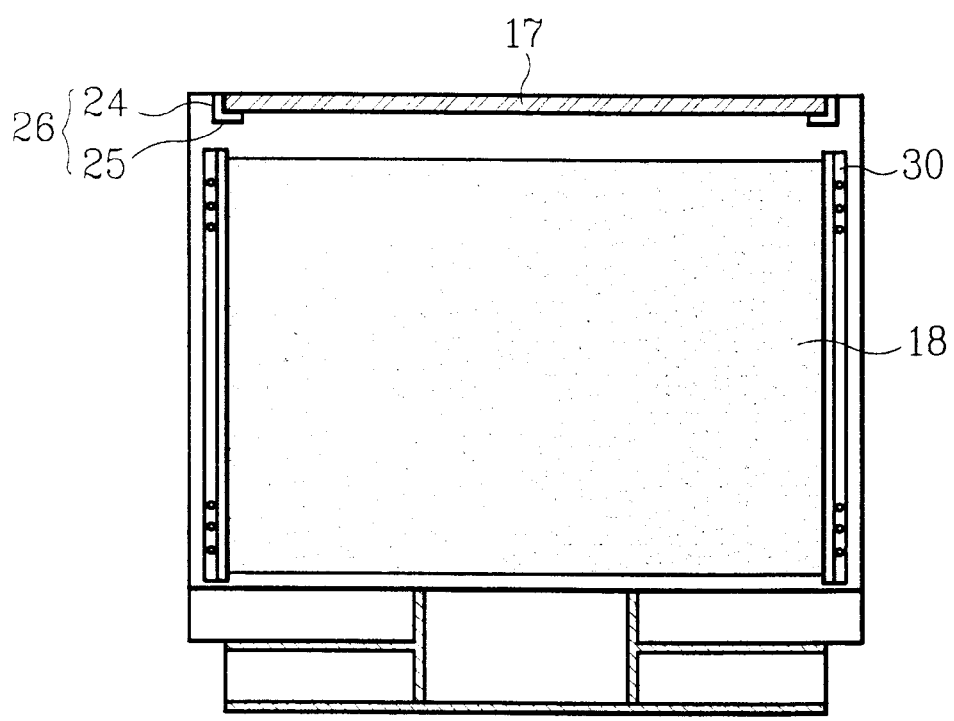
FIG. 5 is a front view illustrating a projection monitor having a darkroom according to an embodiment of the present invention.

As shown in FIG. 4, second and third reflection mirrors 17 and 18 among three reflection mirrors 16, 17 and 18 capable of guiding the image projected by the engine 14 by changing the optical axis(19 of FIG. 6) to the screen are fixed at an inner wall of the darkroom casing 20. The second reflection mirror 17 is fixedly inserted into a ceiling 21 like a drawer, and the third reflection mirror 18 is fixed at the back surface which is slanted in the rearward direction for obtaining a certain reflection angle by the frame 30. As shown in FIG. 5, the second reflection mirror 17 of the ceiling 21 includes a vertical portion 24 arranged at both sides of the ceiling 21 in the front and rearward directions in a pair shape and downwardly extended from each ceiling 21, and a horizontal portion 25 extended inwardly from the lower portion of the vertical portion 24 and is fixedly inserted between two fixing ribs 26 each having a L-shaped cross-sectional surface like a drawer. The third reflection mirror 18 including both sides fixed by the frame 30 fixed by the screw 32 is attached to the back surface of the darkroom casing 20. In particular, as shown in FIGS. 3 and 4, the second reflection mirror 17 is stably fixed by the bracket 27 inserted between the ceiling 21 of the darkroom casing 20 and the fixing rib 26.

The reference numeral 15 of FIG. 3 represents a cylindrical pipe attached to an end of the engine 14 for stably guiding light emitted from the engine 14. The reference numerals 28 and 31 of FIG. 4 are screw engaging holes formed in the back surface 22 of the darkroom casing 20 and the frame 30 for engaging the screw 32 which fixes the frame 30 to the darkroom casing 20.

Figure 6:
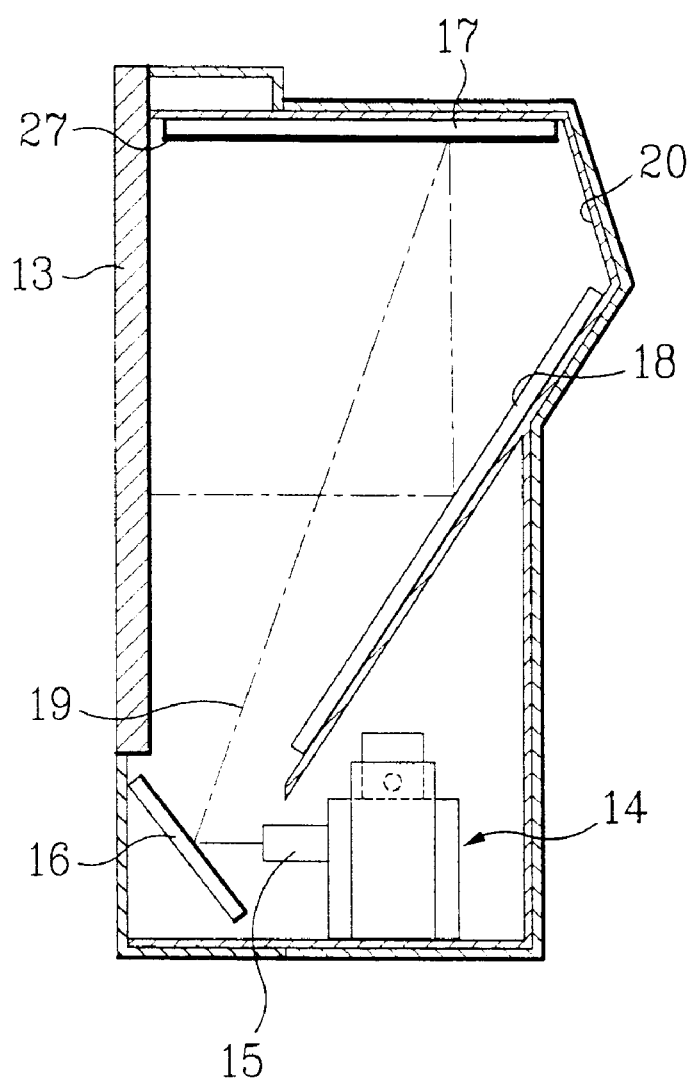
FIG. 6 is a schematic lateral cross-sectional view illustrating a projection monitor having a darkroom casing according to an embodiment of the present invention.

As shown in FIG. 6, in the projection monitor having a darkroom casing according to the present invention, when an electrical video signal is inputted into the engine 14, the engine 14 generates light based on the inputted signal and adjusts the way of the light and projects the light as an image. The first, second and third reflection mirrors 16, 17 and 18 changes the optical axis 19 for thereby guiding the image onto the screen 13. Therefore, the image generated based on the inputted electrical video signal is displayed on the screen 13 exposed on the front surface of the front casing 11.

As described above, in the projection monitor having a darkroom casing according to the present invention, the darkroom casing engaged to the front casing in the rear casing is capable of preventing foreign material such as dust which may scatter the light projected by the engine from being penetrated into the interior and preventing any leakage of light, so that it is possible to obtain a good resolution with respect to the screen without any light scattering, interference or leakage. In addition, since three reflection mirrors are provided, the image projection distance between the engine and the screen is increased, so that the image expanding ratio proportional to the distance is increased, and it is possible to accurately adjust the characteristics of the image. Therefore, in the present invention, a big size screen may be obtained, and the image may be easily controlled.

In addition, in the present invention, the second reflection mirror attached on the ceiling of the darkroom casing is easily fixed by inserting between a pair of fixing ribs installed at both sides of the ceiling unlike the apparatus of FIG. 1 where the worker must attach the second reflection mirror with his waist bent for thereby implementing an excellent assembling operation.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A projection monitor, comprising:
   a front casing having a screen installed on a front surface of the same;
   a rear casing engaged to the back of the front casing and forming a sealed space behind the front casing;
   a darkroom casing engaged to the back of the front casing in the rear casing and forming a darkroom by which a foreign material and light do not penetrate into the interior of the rear casing;
   an engine installed in the interior of the darkroom casing and generating and light in accordance with an input of an electrical video signal and projecting an image; and
   three reflection mirrors attached on an inner wall of the darkroom casing and sequentially reflecting the image projected by the engine and guiding the image to the screen, one of said three reflection mirrors being inserted into fixing ribs installed parallel on the ceiling of the darkroom casing like a drawer.

2. The monitor of claim 1, further comprising a bracket engaged to a front rim portion of the reflection mirror fixed on the ceiling of the darkroom casing and inserted between the ceiling of the darkroom casing and the fixing rib when the reflection mirror is inserted between the ceiling of the darkroom casing and the fixing rib for thereby preventing an escape of light from the reflection mirror.

3. The monitor of claim 1, wherein said rear wall of the darkroom casing is slanted in the back direction, and at least one among the reflection mirrors is fixed by the frame at both sides of the same and is attached on the rear wall of the darkroom casing.

4. A projection monitor, comprising:
   a front casing having a screen installed on a front surface of the same;
   a rear casing engaged to the back of the front casing and forming a sealed space behind the front casing;
   a darkroom casing engaged to the back of the front casing in the rear casing and forming a darkroom by which a foreign material and light do not penetrate into the interior of the rear casing;
   an engine installed in the interior of the darkroom casing and generating and light in accordance with an input of an electrical video signal and projecting an image; and
   three reflection mirrors attached on an interior side of panels that make up said darkroom casing, each of said three reflection mirrors sequentially reflecting the image projected by the engine and guiding the image to the screen.

5. The projection monitor of claim 4, wherein an interior portion of a top panel of said darkroom casing comprises a pair of rails for slidably inserting one of said three reflection mirrors thereon.

6. The projection monitor of claim 5, further comprising a bracket positioned at a front side of said reflection mirror slidably attached to said rails preventing light and foreign material from entering or leaving said darkroom casing.

7. The projection monitor of claim 4, wherein a back panel of said darkroom casing is sloped inward and one of said three reflection mirrors is disposed on an interior surface of said back panel.

8. A method of assembling a projection monitor, comprising the steps of:
   placing an image forming apparatus on a bottom side of a darkroom casing;
   attaching rails to an interior side of a top side of said darkroom casing;
   slidably inserting a first reflection mirror into said rails on said top, interior side of said darkroom casing;
   attaching a second reflection mirror to an inwardly slanted back side of said darkroom casing;
   attaching a third reflection mirror near an output of said image forming apparatus;
   attaching a screen to a front side of said darkroom casing; and
   attaching rear and front casings to said darkroom casing.

9. The method of claim 8, further comprising the step of attaching a bracket to a front portion of said second reflection mirror.

* * * * *